United States Patent
Wada et al.

[11] Patent Number: 5,173,858
[45] Date of Patent: Dec. 22, 1992

[54] SUSPENSION CONTROL SYSTEM FOR ENHANCING RESPONSE CHARACTERISTICS OF A VEHICLE BODY

[75] Inventors: Shunichi Wada; Yoshihiro Tsuda, both of Hyogo, Japan

[73] Assignee: Mitsubishi Denki K.K., Tokyo, Japan

[21] Appl. No.: 629,770

[22] Filed: Dec. 18, 1990

[30] Foreign Application Priority Data

Dec. 19, 1989 [JP] Japan .................. 1-327385

[51] Int. Cl.⁵ .................. B60G 17/01; B60G 17/015; B60G 11/26
[52] U.S. Cl. .................. 364/424.05; 280/707
[58] Field of Search ........ 364/424.05, 424.01; 280/707, 690

[56] References Cited

U.S. PATENT DOCUMENTS

| | | | |
|---|---|---|---|
| 4,639,014 | 1/1987 | Tanaka et al. | 280/707 |
| 4,685,689 | 8/1987 | Takizawa et al. | 280/707 |
| 4,765,648 | 8/1988 | Mander et al. | 280/707 |
| 4,805,101 | 2/1989 | Dietrich et al. | 364/424.01 |
| 4,809,179 | 2/1989 | Klinger et al. | 364/424.05 |
| 4,872,701 | 10/1989 | Akatsu et al. | 280/707 X |
| 4,898,257 | 2/1990 | Brandstadter | 280/707 |
| 4,900,056 | 2/1990 | Fukushima et al. | 280/707 X |
| 4,905,152 | 2/1990 | Kawabata | 364/424.05 |
| 4,923,038 | 5/1990 | Lizell | 280/707 X |
| 4,953,890 | 9/1990 | Kamimura | 280/707 |

FOREIGN PATENT DOCUMENTS

188289 7/1986 European Pat. Off.
224204 6/1987 European Pat. Off.

Primary Examiner—Parshotam S. Lall
Assistant Examiner—Collin W. Park
Attorney, Agent, or Firm—Sughrue, Mion, Zinn, Macpeak & Seas

[57] ABSTRACT

A suspension control system for enhancing the response characteristic of a vehicle body vibration suppressing control by lowering the spring constant or the damping force to a first desired level for both front and rear wheels at a time or only the rear wheel for a predetermined time in accordance with a differential value of an output signal from an acceleration detecting means in the vertical direction of the vehicle body, to thereby soften the shock of the vehicle body when the rear wheels get over a protuberance, and also by changing the spring constant or the damping force settled beforehand to a second desired level for both front and rear wheels at a time in case an unnecessary vibration of the vehicle body is detected afterwards. The second desired level is held for a predetermined time or continuously to suppress vertical vibrations of the vehicle body.

5 Claims, 8 Drawing Sheets

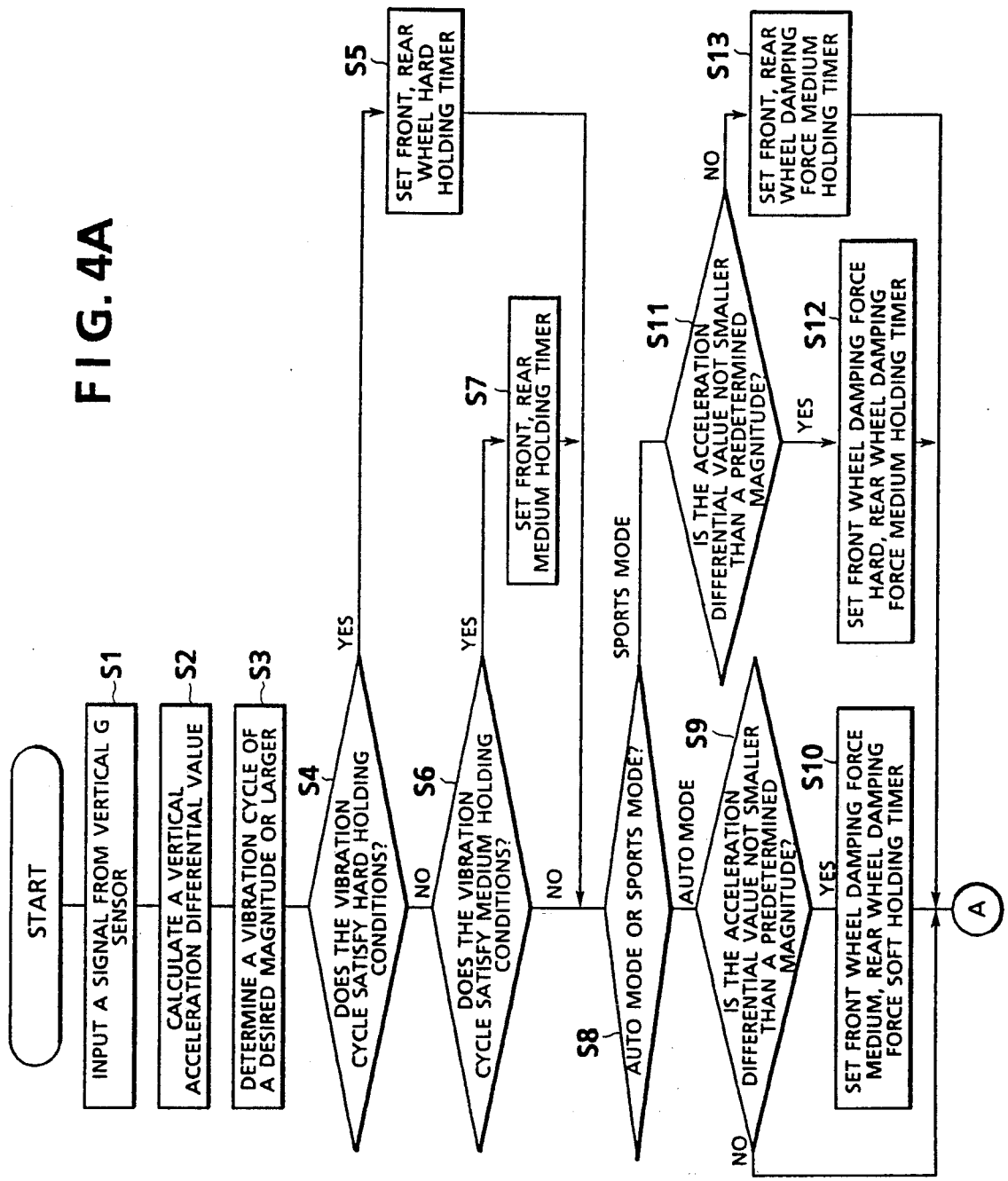

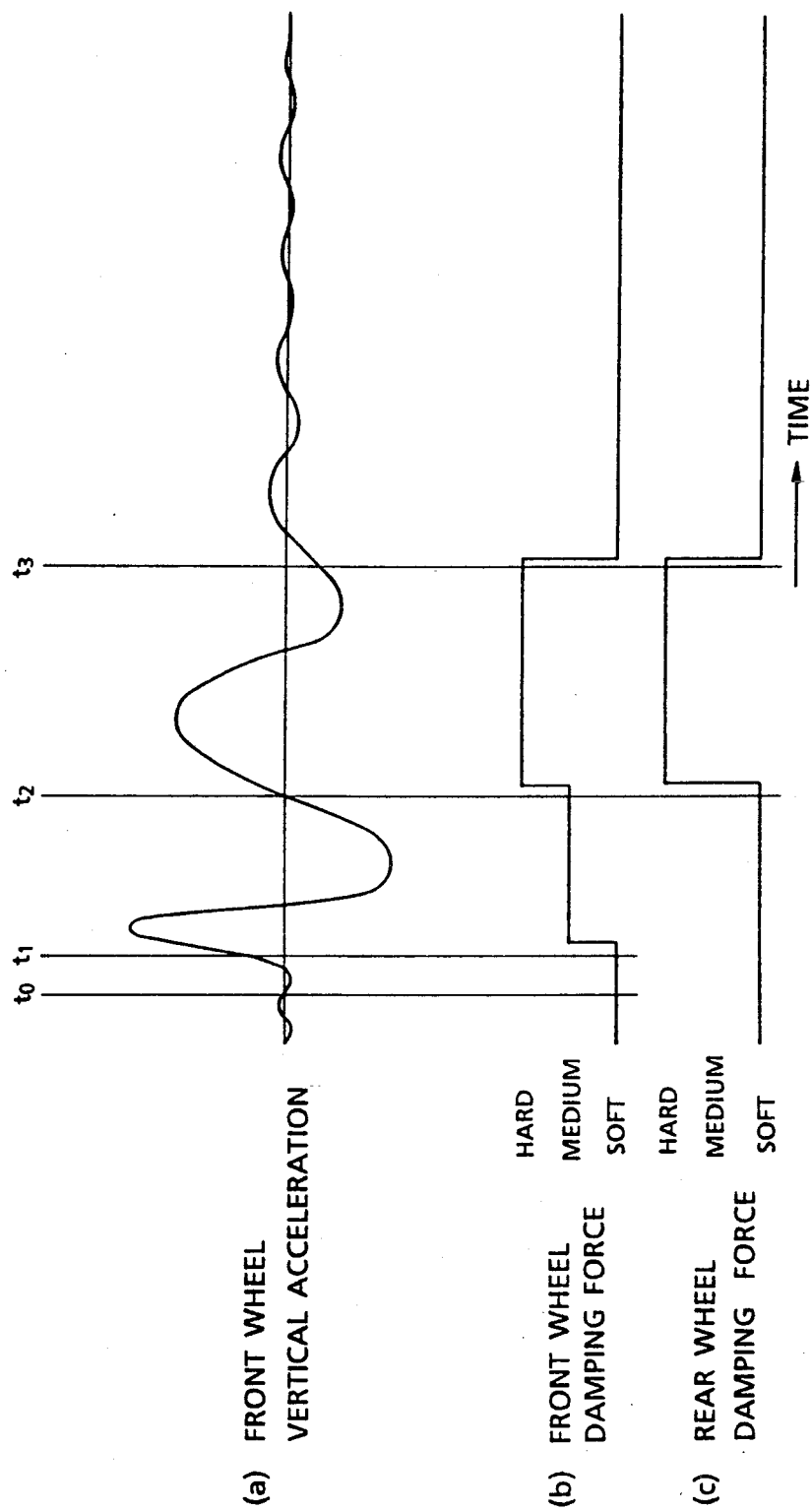

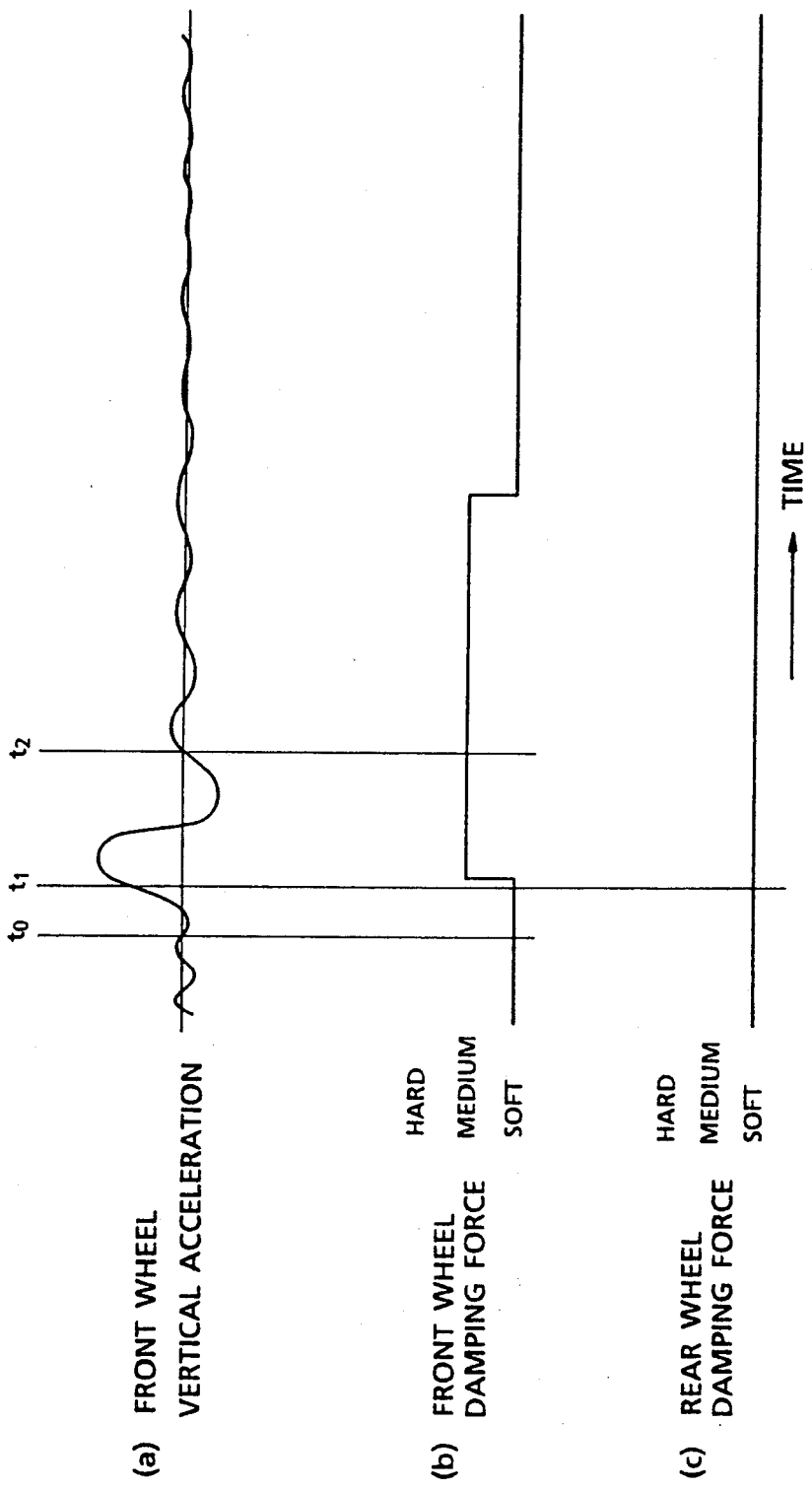

SUSPENSION CONTROL SYSTEM FOR ENHANCING RESPONSE CHARACTERISTICS OF A VEHICLE BODY

BACKGROUND OF THE INVENTION

1. Field of the Invention

The present invention relates to a suspension control system and more particularly to a suspension control system effective for suppressing a single shock caused by unevenness of the road surface during vehicular running and subsequent vibration of the vehicle body.

2. Description of the Prior Art

Heretofore, as a vehicular suspension control system, there has been known the suspension control system described in Japanese Patent Laid Open No. 166715/86. This conventional suspension control system will now be explained with reference to FIG. 7. It is provided with a front wheel acceleration detecting means M2 for detecting an acceleration of component applied to a front wheel M1 in a direction perpendicular to the road surface; a discriminator means M3 for discriminating whether or not the acceleration detected by the front wheel acceleration detecting means M2 is outside a predetermined range; and a rear wheel suspension characteristic changing means M5 for changing suspension characteristics of a rear wheel M4 once it is judged by the discriminator means M3 that the detected acceleration is outside the predetermined range.

According to the above construction, the acceleration of a component operating in a direction perpendicular to the road surface is detected by the front wheel acceleration detecting means M2, and the degree of a concavity or a convexity of the road surface is judged by the discriminator means M3 on the basis of the detected acceleration. The result of this judgement is transmitted to the rear wheel suspension characteristic changing means M5. At this time, if the concave or the convex parameter is very large and exceeds a predetermined range, the vibration of the rear wheel M4 is dampened or high steerability and stability are ensured by the rear wheel suspension characteristic changing means M5.

The above conventional suspension control system adopts a controlling method in which an obstacle is detected on the basis of only the level of acceleration for controlling the rear wheel in accordance with the detected acceleration level, and then the passing of the rear wheel beyond the obstacle is judged on the basis of a vehicle speed so as to return the damping force to the original level. Accordingly, the fact is that detection of an obstacle is difficult and uncertain. Besides, in the case of periodically repeated obstacles such as, for example, joint portions of the road surface of an expressway, it is required to change the suspension frequently in synchronism with the road surface irrespective of the vehicular body vibration. Consequently, not only it is impossible to surely detect joint portions of the road surface but also dissatisfaction has heretofore been encountered in effectively suppressing the resonance with the vehicle body to soften the shock from the road surface.

Further, even when a vehicular body resonance is caused by frequently repeated obstacles, there is not enough time to bring a damping force to a hard level or harden the suspension. Additionally, with only a signal from an obstacle, it is not sure whether or not the vehicle body is actually undergoing a harmful vibration.

SUMMARY OF THE INVENTION

The present invention has been accomplished for solving the above-mentioned problems, and it is the object thereof to provide a suspension control system capable of suppressing a vehicular body resonance effectively and softening a shock from the road surface.

The suspension control system according to the present invention includes an acceleration detecting means for detecting a vertical acceleration of a vehicle body; a spring constant or damping force changing means for making at least one of a spring constant and a damping force of a vehicle body suspension variable in at least two stages for front and rear wheels independently of each other; means for calculating a differential value of an output signal provided from the vertical acceleration detecting means; a first damping force or spring constant determining means for changing at least one of the above spring constant and damping force into a soft level for both front and rear wheels at a time or only the rear wheel for only a predetermined time or continuously in accordance with an output signal provided from the differential value calculating means and holding the thus-changed value; a vibration cycle judgment means for judging a vibration cycle of the vehicle body on the basis of an output signal provided from the acceleration detecting means during operation of the first damping force or spring constant determining means; and a second damping force or spring constant changing and holding means for changing at least one of the above spring constant and damping force into a desired level for both front and rear wheels each independently or simultaneously in accordance with an output signal provided from the vibration cycle judgment means and holding the thus-changed level for a predetermined time.

According to the present invention, in the case where an initial large shock of a vehicle body or a great change in posture of the vehicle body occurring when the vehicle body gets over a large protuberance is to be controlled appropriately, in order to enhance the response characteristic of a vehicle body vibration suppressing control, the spring constant or the damping force is lowered to a first desired level for both front and rear wheels at a time or only the rear wheel for a predetermined time in accordance with a differential value of an output signal from the acceleration detecting means in the vertical direction of the vehicle body, to thereby soften the shock of the vehicle body when the rear wheels get over the protuberance.

At the same time, a vibration cycle in the vertical direction of the vehicle body, and after detection of an unnecessary vibration of the vehicle body, the spring constant or the damping force is changed to a second desired level for both front and rear wheels at a time, then this level is held for a predetermined time or continuously to suppress vertical vibrations of the vehicle body.

BRIEF DESCRIPTION OF THE DRAWINGS

FIGS. 1 to 6 illustrate a suspension control system according to an embodiment of the present invention, of which:

FIG. 1 is a connection diagram showing a basic construction;

FIG. 2 is a perspective see-through view showing an arrangement relation of components of the control system as mounted on a vehicle;

FIG. 3 is a connection diagram of the components shown in FIG. 2;

FIGS. 4A and 4B indicate a continuous flowchart showing the flow of operations;

FIGS. 5 and 6 are waveform diagrams each showing vertical vibrations of a vehicle body with respect to time for explaining operations.

DETAILED DESCRIPTION OF A PREFERRED EMBODIMENT

An embodiment of the present invention will now be described in detail hereinbelow with reference to FIGS. 1 to 6.

Figure 1:
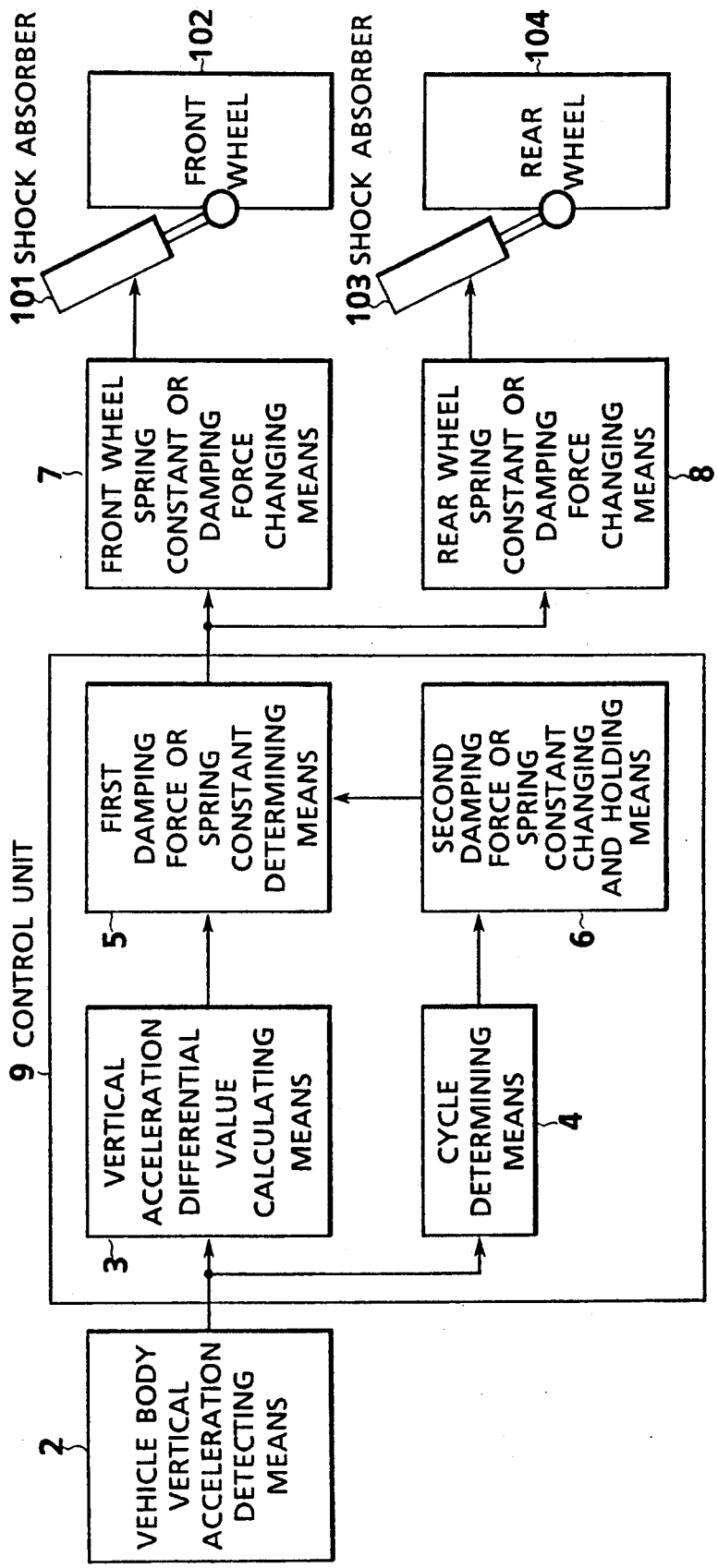

Referring to FIG. 1, the suspension control system of this embodiment comprises an acceleration detecting means 2 for detecting acceleration in vertical opposite directions of a vehicle body; a control unit 9 including means 3 for calculating a differential value of a vertical acceleration, means 4 for determining a vibration cycle of the vehicle body on the basis of a vertical acceleration signal, means 6 for changing or holding a damping force or a spring constant on the basis of the results obtained and a first damping force or spring constant determining means 5; a front wheel spring constant or damping force changing means 7; and a rear wheel spring constant or damping force changing means 8. The numerals 101 and 103 denote a front wheel shock absorber and a rear wheel shock absorber, respectively, disposed between front and rear wheels 102, 104 and the vehicle body.

Figure 2:
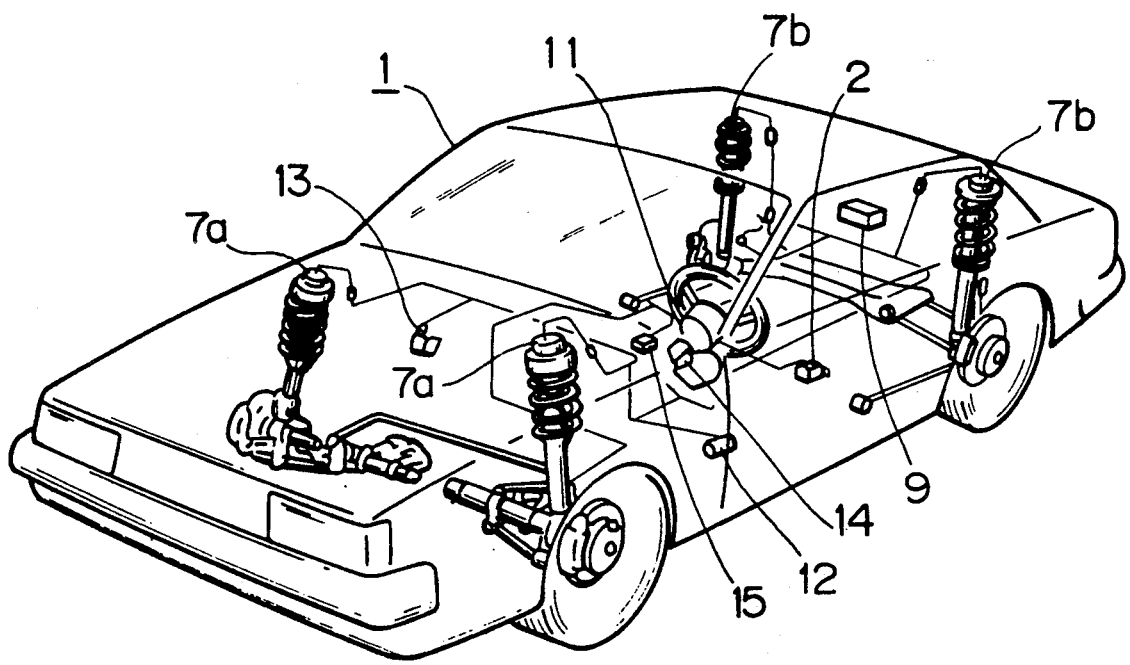
Figure 3:
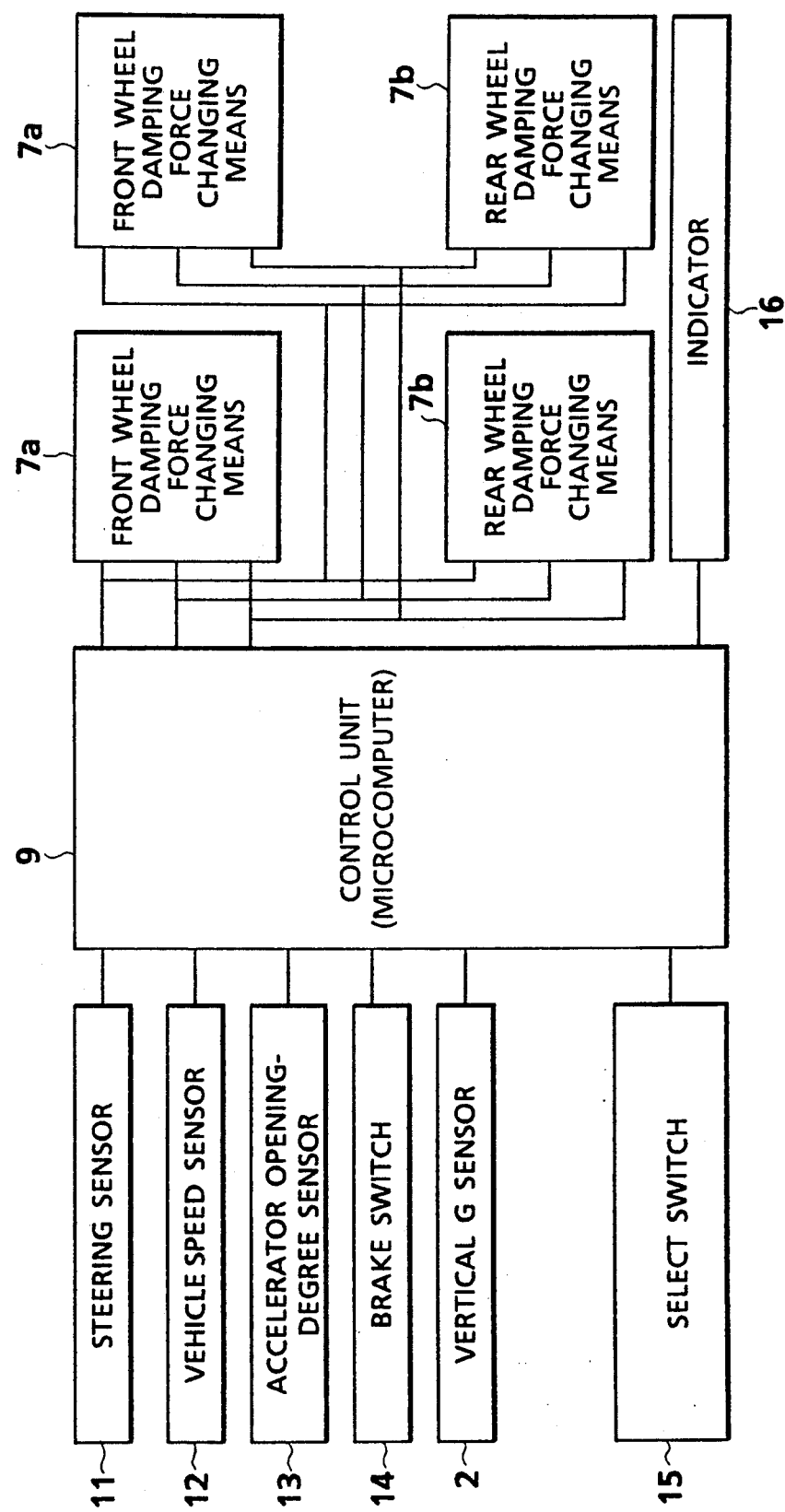

Referring now to FIGS. 2 and 3, reference numeral 11 designates a steering sensor for detecting an operating condition of a steering wheel, 12 designates a vehicle speed sensor as a vehicle speed detecting means, 13 designates an accelerator opening-degree for detecting accelerative or decelerative operation of the vehicle body 1, 14 designates a brake switch, 15 designates a select switch, and 16 designates an indicator.

The outputs of the steering sensor 11, vehicle speed sensor 12, accelerator opening-degree sensor 13, brake switch 14 and select switch 15 are fed to the control unit 9, which in turn controls the indicator 16 and damping force changing means 7a, 7b.

The acceleration detecting means 2 is a vertical acceleration sensor (hereinafter referred to as the "vertical G sensor") for detecting an acceleration in the vertical direction of the vehicle body 1, and it is selected from an acceleration pickup constructed of a piezoelectric body or various automotive acceleration sensors of a differential transducer type or a semiconductor strain gauge type.

Although in this embodiment the vertical G sensor is located at the center of gravity of the vehicle body 1, it may be disposed at a front position of the vehicle body 1, or at both the front and rear positions of the vehicle body, or at every suspension for the vehicle.

The vertical G sensor 2 linearly outputs an analog voltage signal corresponding to the vertical acceleration with a reference output level defined at zero acceleration. The output of the vertical G sensor 2 is subjected to A/D (analog/digital) conversion and then fed to the control unit 9 which is constituted by a microcomputer and which calculates a change in the single level of the acceleration G sensor 2, an acceleration differential value and a vibration cycle.

The processing procedure of the control unit 9 will be described below with reference to the flowchart of FIG. 4 and the output waveform of the vertical G sensor 2 shown in FIG. 5.

In FIG. 5, (a) illustrates an output waveform of the vertical G sensor with respect to a front wheel in the presence of a periodic vibration after the vehicle body 1 travels over a large protuberance. In this connection, (b) and (c) show an example of damping force control for front and rear wheels, respectively.

First, at time t0, the front wheel has not yet traveled over the protuberance. In step S1 in FIG. 4A, the control unit inputs the output of the vertical G sensor 2, then calculates in step S2 a differential value of the output level of the sensor 2, and in step 3 calculates a vibration cycle of the vehicle body 1 on the basis of the output of the vertical G sensor 2. Since at time t0 there is not detected an amplitude of a desired magnitude or larger, execution proceeds from step S4 to step S6 and further to step S8.

Figure 4B:
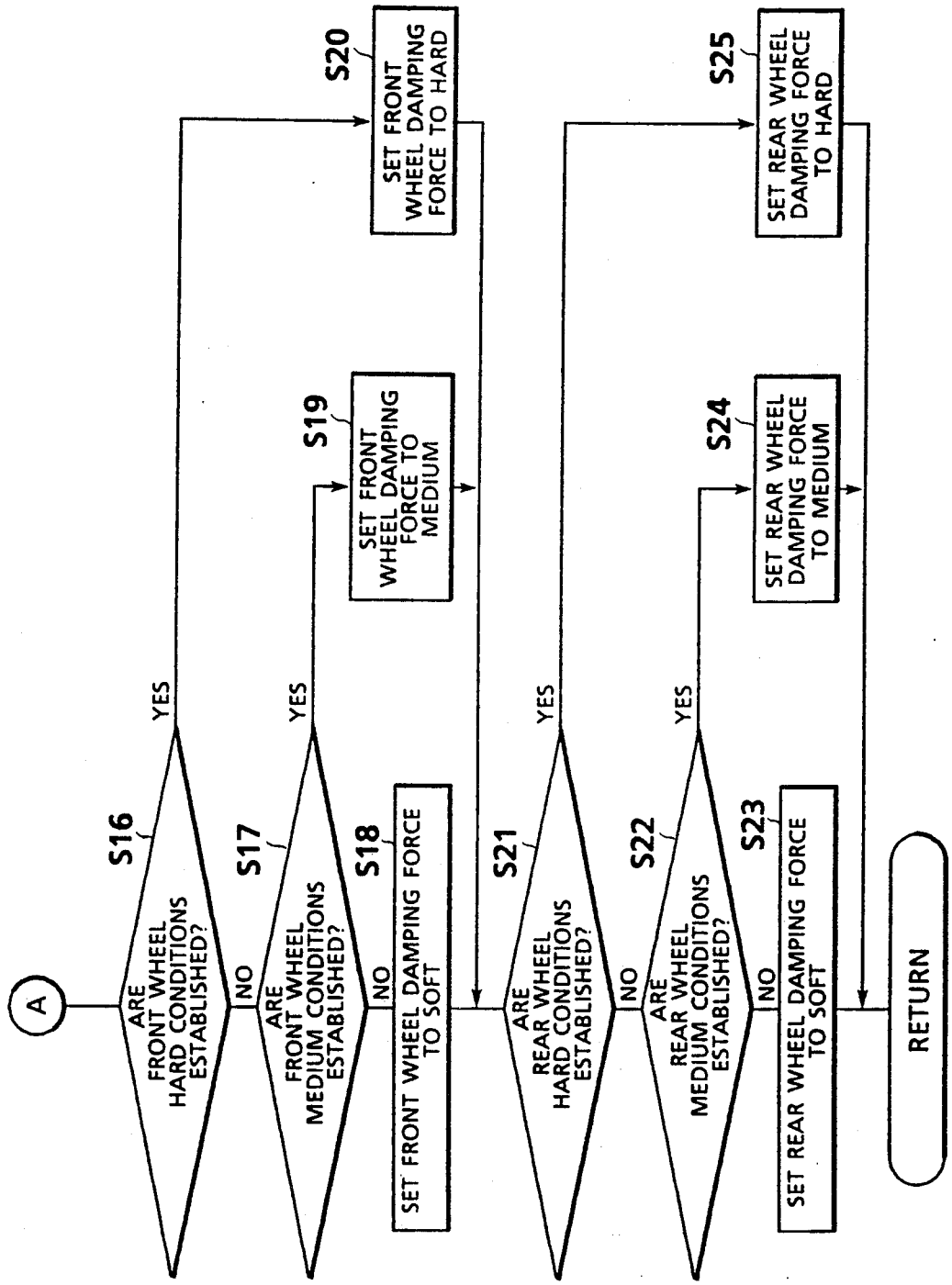
Figure 7:
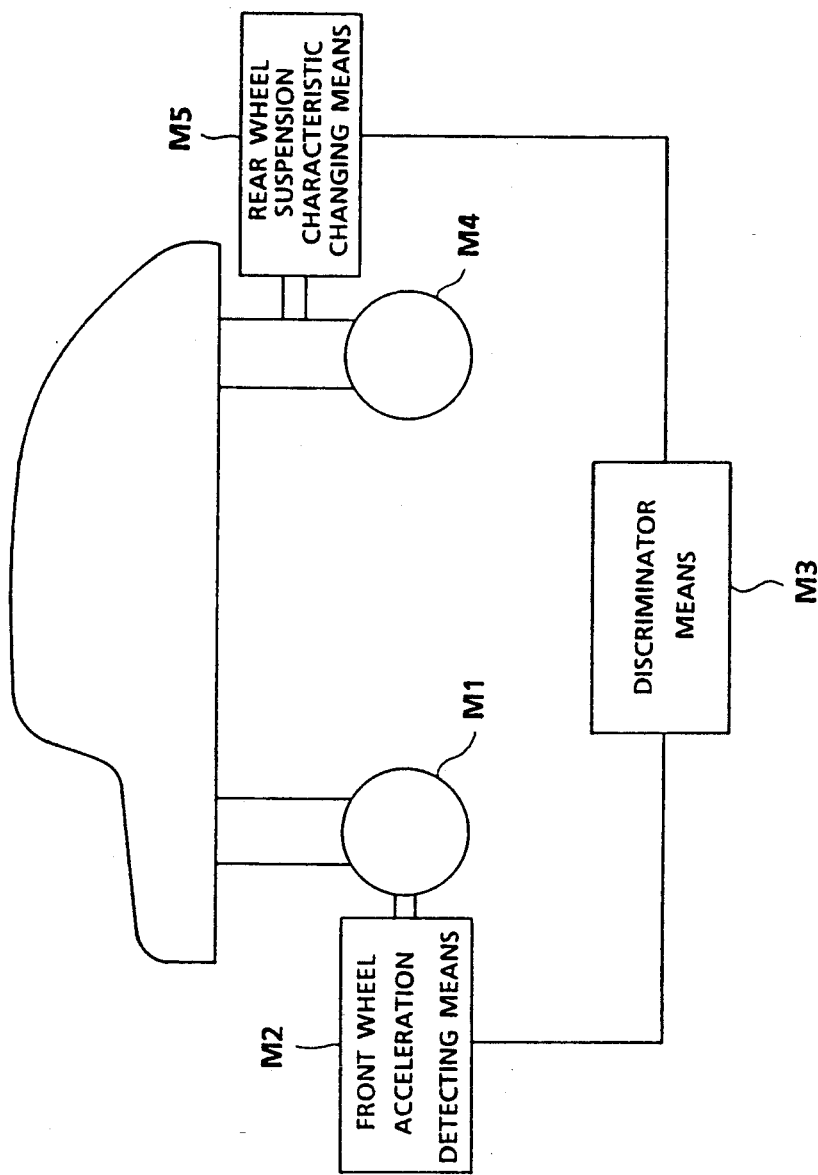
FIG. 7 is a connection diagram of a conventional suspension control system.

In step S8 there is determined a damping force mode selected by the select switch 15. More specifically, if the mode is auto mode, the damping force is normally SOFT for both front and rear wheels, while in the case of sports mode, the damping force is normally MEDIUM for both front and rear wheels. Here, assuming that the mode is auto mode, execution proceeds to step S9. In step S9, judgement is made as to whether the differential value of the acceleration output of the vertical G sensor already obtained in step S2 is not smaller than a predetermined magnitude. Since at time t0 there is not detected a differential value greater than or equal to the predetermined magnitude, execution proceeds to step S16 as shown in FIG. 4B. In step S16 to S25, conditions for HARD, MEDIUM and SOFT are determined with respect to front and rear wheels independently of each other and a damping force is set for each of them.

The processing procedure of the control unit 9 at time t1 will now be explained. After inputting a signal from the vertical G sensor 2 in step S1, the control unit 9 judges in step S2 whether the differential value of the vertical acceleration corresponds to a predetermined magnitude or not. Since the vibration is not of the desired magnitude or larger, the determination of a vibration cycle is not made in step S3 and execution proceeds to step S4. Since the vibration cycle has not been determined yet, execution further proceeds from step S4 to step S6 and S8. In step S8 the damping force mode is assumed to be auto mode, and execution passes to step S9. In step S9, it is judged that the differential value of the vertical acceleration exceeds the predetermined magnitude, and execution passes to step S10. In step S10, a holding timer is set to set the front wheel damping force to MEDIUM and the rear wheel damping force to SOFT, then execution passes to step S16. In steps S16 to S25, a control is made to set the front and rear wheel damping forces to MEDIUM and SOFT, respectively, in accordance with what was done in step S10.

The following description is now provided about the processing procedure of the control unit 9 when a periodic vibration of the vehicle body 1 is started after the vehicle body travels over the protuberance at time t2. After inputting an output signal from the vertical G sensor in step S1, the control unit 9 calculates a differential value of the acceleration in step S2, then in step S3 measures a vibration cycle, then at time t2, it is assumed that the vibration is not smaller than the desired magnitude, and its cycle is measured. Next, execution passes to step S4, in which if it is judged that at time t2 the magnitude and cycle of the vibration of the vehicle body 1 require suppressing the posture of the vehicle body, execution proceeds to step S5, in which a timer for holding the front and rear wheel damping forces in HARD condition is set, then execution proceeds to step S8. After the mode is assumed to be auto mode and execution passes to step S9, since at time t2 the differential value of the acceleration is smaller than the predetermined value, execution passes to step S16 in FIG. 4B. In steps S16 to S25 the damping forces of the front and rear wheels are controlled, but at time t2 both front and rear wheel damping forces are set to HARD for a predetermined time from time t2 to time t3 by the HARD holding timer which was set in step S5, to suppress the vibration of the vehicle body 1.

Referring now to FIG. 6 (a), there is illustrated an output waveform of the vertical G sensor 2 with respect to the front wheel obtained when the vehicle vibration is small and does not reach a desired vibration cycle after the vehicle body travels over the protuberance. In this connection, (b) and (c) show an example of damping force control for the front and rear wheels, respectively.

Explanation will now be made in accordance with the flowchart of FIGS. 4A and 4B. From time t0 to time t1 there is made the same control as in FIG. 5 (a). That is, since at time t1 the differential value of the vertical acceleration is not smaller than the predetermined value, execution proceeds to step S10 in accordance with the judgment made in step S9. In step S10, the timer for holding the front and rear wheel damping forces in MEDIUM and SOFT conditions, respectively, is set and then execution proceeds to step S16. In step S16 and steps which follow, the front and rear wheel damping forces are controlled to MEDIUM and SOFT, respectively, by the timer which holds the front and rear wheel damping forces in MEDIUM and SOFT conditions, respectively, and which was set in step S10. Since after the time t2 the vertical vibration of the vehicle body 1 is small, a vibration cycle of the desired magnitude or larger is not measured in step S3. In steps S4 and S6, therefore, the holding timer is not set with respect to both HARD and MEDIUM of the front and rear wheels, and execution passes to step S16.

In step S16 to S25, the control is continued until the front wheel MEDIUM, rear wheel SOFT holding timer which was set in step S10 reaches the preset time.

The suspension control procedure is completed in accordance with the above procedures. Although in the above embodiment the daming forces are changed over in three stages, it goes without saying that the same effect can be obtained even if the damping forces are changed over in more stages or simultaneously with spring constant.

According to the present invention, as set forth hereinabove, when the vehicle body travels over a large protuberance, the resulting vibration is sure to be detected by the vertical G sensor, and in the case where the differential value of the vertical G sensor is large, it can be detected in an early stage because of a differential value. For example, by hardening the suspension characteristic on the front wheel side, the steerability and stability of the vehicle body are improved, while the suspension characteristic of both front and rear wheels or of the rear wheels is made soft, whereby the shock can be softened when the rear wheels travel over the protuberance. In the case where the vehicle body starts a periodic vibration after both front and rear wheels travels over the protuberance, a vertical vibration of the vehicle body is detected by the vertical G sensor and the suspension characteristic is made hard for both front and rear wheels to suppress the vibration of the vehicle body, whereby the steerability and stability of the vehicle body can be improved.

Where the vehicle body does not start a desired periodic vibration even after traveling over the protuberance, the front and rear wheel damping forces are not changed over and control is continued to keep the front and rear wheel damping forces or the rear wheel damping force soft for a predetermined time. This is effective in reducing the shock which the vertical body will undergo when getting over the next joint portion of the road surface. Besides, even if the above predetermined time is set long, the suspension characteristic can be changed easily in the case where it should be made hard in an early stage or should be returned to the original characteristic.

What is claimed is:

1. A suspension control system comprising:
   an acceleration detecting means for detecting a vertical acceleration of a vehicle body;
   a vertical acceleration differential value calculating means for calculating a differential value of an output signal of said vertical acceleration detecting means;
   a first damping force and spring constant determining means for setting and holding, in accordance with an output signal of said vertical acceleration differential value calculating means, at least one of said spring constant and said damping force to one of a plurality of settings for both front and rear wheels simultaneously, for only the rear wheels for a predetermined time, or for only the rear wheels continuously;
   a cycle judgement means for judging a vibration cycle of the vehicle body on the basis of said output signal of said vertical acceleration detecting means during operation of said first damping force and spring constant determining means;
   a second damping force and spring constant determining means for setting and holding for a predetermined time, in accordance with an output signal of said vibration cycle judgment means, at least one of said spring constant and said damping force to a desired one of said plurality of settings for front and rear wheels simultaneously; and
   a spring and damping force changing means for variably controlling at least one of said spring constant and damping force of said vehicle body suspension in accordance with outputs of said first and second damping force and spring constant determining means.

2. A suspension control system as claimed in claim 1, wherein the setting set by said second damping force and spring constant changing and holding means has priority to the setting set by said first damping force and spring constant determining means.

3. A suspension control system as claimed in claim 1, wherein the setting of at least one of said spring constant and said damping force is determined in one of two modes, such that the setting selected for the front and rear wheels in one mode is always harder than the setting selected in the other mode.

4. A suspension control system as claimed in claim 3, wherein said two modes comprise an auto mode and a sport mode.

5. A suspension control system as claimed in claim 1, wherein said plurality of settings comprises HARD, MEDIUM and SOFT.

* * * * *